US008671107B2

(12) United States Patent
Scully et al.

(10) Patent No.: US 8,671,107 B2
(45) Date of Patent: Mar. 11, 2014

(54) METHOD AND APPARATUS FOR GLOBAL INFORMATION REPORTING

(75) Inventors: John E. Scully, Chicago, IL (US); Milton Santiago, Jr., Chicago, IL (US); Christopher Hope, London (GB)

(73) Assignee: Bank of America Corporation, Charlotte, NC (US)

( * ) Notice: Subject to any disclaimer, the term of this patent is extended or adjusted under 35 U.S.C. 154(b) by 114 days.

(21) Appl. No.: 13/198,511

(22) Filed: Aug. 4, 2011

(65) Prior Publication Data
US 2012/0143903 A1 Jun. 7, 2012

Related U.S. Application Data

(60) Provisional application No. 61/418,985, filed on Dec. 2, 2010.

(51) Int. Cl.
G06F 7/00 (2006.01)
G06F 17/30 (2006.01)

(52) U.S. Cl.
USPC .......................................... 707/769

(58) Field of Classification Search
None
See application file for complete search history.

(56) References Cited

U.S. PATENT DOCUMENTS

| | | | |
|---|---|---|---|
| 6,134,563 A | 10/2000 | Clancey et al. | |
| 6,631,402 B1 | 10/2003 | Devine et al. | |
| 6,665,704 B1 | 12/2003 | Singh | |
| 6,997,380 B2 | 2/2006 | Safaei et al. | |
| 7,669,145 B2 | 2/2010 | Arrouye et al. | |
| 7,680,877 B2 | 3/2010 | Regnier et al. | |
| 7,681,044 B2 | 3/2010 | Goto | |
| 7,822,769 B2 | 10/2010 | Rohan et al. | |
| 2001/0029475 A1* | 10/2001 | Boicourt et al. | 705/30 |
| 2002/0095382 A1 | 7/2002 | Taoka et al. | |
| 2002/0129054 A1 | 9/2002 | Ferguson et al. | |
| 2003/0014350 A1 | 1/2003 | Duell et al. | |
| 2005/0246269 A1 | 11/2005 | Smith | |
| 2006/0282381 A1 | 12/2006 | Ritchie | |
| 2007/0011099 A1 | 1/2007 | Sheehan | |
| 2007/0118530 A1 | 5/2007 | Chow et al. | |
| 2007/0203816 A1 | 8/2007 | Costache et al. | |
| 2009/0150213 A1 | 6/2009 | Cyr et al. | |
| 2012/0209635 A1* | 8/2012 | Young et al. | 705/4 |

OTHER PUBLICATIONS

Barth "Research, Standard Setting, and Global Financial Reporting" Foundations and Trends in Accounting, vol. 1, No. 2, 2006, 96 pages.*

(Continued)

Primary Examiner — Uyen Le
(74) Attorney, Agent, or Firm — Weiss & Arons LLP; Michael A. Springs, Esq.

(57) ABSTRACT

Systems and methods for global information reporting are provided. A global information reporting system according to the invention may include a database configured to store reporting information, memory configured to store execution instructions and a processor coupled with the database and the memory. The processor is configured to execute the instructions. Preferably the system incorporates HTML with active areas. The active areas load small Java® applets, permitting rapid page loads. The Java® applets facilitate manipulation of the viewable portion of reports. The same applets can search data in the viewable and the non-viewable portions of the data set. Sticky notes may be attached to reports or transaction to "follow" the data during storage and provide persistent reminders.

22 Claims, 11 Drawing Sheets

(56) References Cited

OTHER PUBLICATIONS

International Search Report for Application No. PCT/US 11/62150, Jul. 27, 2012.
International Search Report for Application No. PCT/US 09/49671, Aug. 17, 2009.

"Bank Gains Competitive Edge with a Unique XML-Based Desktop Liquidity Solution," Microsoft Corporation, Feb. 2006, Redmond, Washington.
Santiago, Milton, "Curing Your Cash Positioning Ailments in the Sarbanes-Oxley Era," LaSalle Bank, Chicago, Illinois, Applicants believe that the publication was published prior to the filing date of this application.

* cited by examiner

Prior Art

Information Reporting - Dashboard

| DIRECT | REPORTING | PAYMENTS | TRADE | LIQUIDITY | NOTIFICATIONS | SUPPORT | ADMIN |

REPORTING > DASHBOARD

DASHBOARD | REPORTS | RESEARCH | STATEMENTS

+ ADD COMMENT

⊟ BALANCES  ✕

ACCOUNTS | TOTALS | OPENING LEDGER BALANCE (16) | CLEAR FILTER

⦿ PREVIOUS DAY ○ CURRENT DAY

| ACCOUNT NUMBER | ACCOUNT NAME | BANK ID | AMOUNT | CURRENCY |
|---|---|---|---|---|
| 052006006122 | ACCOUNTNAME | 061000052 | 0.00 | USD |
| XXXXXXXXXX | ACCOUNTNAME2 | XXXXXXXXX | 0.00 | USD |
| XXXXXXXXXX | ACCOUNTNAME1 | XXXXXXXXX | 221,455.54 | USD |
| XXXXXXXXXX | ACCOUNTNAME3 | XXXXXXXXX | 322,313.30 | USD |
| XXXXXXXXXX | ACCOUNTNAME4 | XXXXXXXXX | 32,403.11 | USD |
| XXXXXXXXXX | ACCOUNTNAME4 | XXXXXXXXX | 438,824.43 | USD |
| XXXXXXXXXX | ACCOUNTNAME4 | XXXXXXXXX | 225,228.53 | USD |

23 ACCOUNTS

⊟ RESEARCH  ✕

AMOUNT | CHECKS

DATE RANGE:

AMOUNT IN:

⊟ FAVORITES  ✕

+ ADD REPORT

| REPORT | DAY TYPE | FORMAT |
|---|---|---|
| ☐ ACH REPORT | PREVIOUS DAY | PDF |
| ☐ ALL DATA SUMMARY AND DETAIL WITH TEXT REPORT | PREVIOUS DAY | PDF |
| ☐ LOAN TRANSACTION REPORT | CURRENT DAY | STANDARD |
| ☐ NON-POST REPORT | PREVIOUS DAY | PDF |
| ☐ RETURNED ITEM REPORT | PREVIOUS DAY | PDF |
| ☐ SWEEP SUMMARY AND DETAIL REPORT | PREVIOUS DAY | STANDARD |
| ☐ WIRE REPORT | CURRENT DAY | STANDARD |

⊟ IMPORTANT MESSAGES  ✕

UNREAD | READ

SYSTEM MAINTENANCE                                    MARK AS READ

DUE TO SYSTEM MAINTENANCE, ONLINE SYSTEM WILL BE UNAVAILABLE FROM 7PM CST ON FRIDAY THROUGH 5AM CST ON MONDAY. WE APOLOGIZE FOR ANY INCONVENIENCE THIS MAY CAUSE OUR USERS.

COLUMBUS DAY HOLIDAY                                  MARK AS READ

IN OBSERVANCE OF THE COLUMBUS DAY HOLIDAY, THE BANK WILL BE CLOSED FOR BUSINESS ON MONDAY. PRIOR DAY ACCOUNT ACTIVITY FOR AS-OF-DATE WILL BE........ON ONLINE SYSTEM. HOWEVER, CONTROLLED DISBURSEMENT SAME DAY AND POSITIVE REPORTS WILL NOT BE AVAILABLE. NORMAL REPORTING WILL RESUME ON TUESDAY.

FIG. 2

Information Reporting - Reports

| DIRECT | REPORTING | PAYMENTS | TRADE | LIQUIDITY | NOTIFICATIONS | SUPPORT | ADMIN |

INFORMATION REPORTING > RESEARCH > PREVIOUS DAY

DASHBOARD | REPORTS | RESEARCH | STATEMENTS

AVAILABLE REPORTS  OPTIONS▼

CREATE CUSTOM

PREVIOUS DAY | CURRENT DAY | COMPLETED REPORTS  ☐ INCLUDE NEW DATA ONLY   21 REPORTS   EDIT TABLES

| | REPORT NAME | FORMAT | DATE RANGE | LAST RUN ▽ | MY REPORTS | REPORT TYPE |
|---|---|---|---|---|---|---|
| | | ▽ | | | | CLEAR FILTER |
| ☐ | ACH REPORT | STANDARD PDF ▽ | DAILY | | | BANK DEFINED |
| ☐ | WIRE REPORT | STANDARD SCREEN | DAILY | | | BANK DEFINED |
| ☐ | ALL DATA SUMMARY AND DETAIL WITH TEXT REPORT | STANDARD PDF | DAILY | | | BANK DEFINED |
| ☐ | CONTROLLED DISBURSEMENT DETAIL REPORT | STANDARD SCREEN | DAILY | | ❖ | BANK DEFINED |
| ☐ | SUMMARY AND DETAIL WITH TEXT REPORT | STANDARD SCREEN | DAILY | | ❖ | BANK DEFINED |
| ☐ | DEPOSIT REPORT | STANDARD SCREEN | DAILY | | | BANK DEFINED |
| ☐ | BALANCE REPORT (VERTICAL) | STANDARD SCREEN | DAILY | | ❖ | BANK DEFINED |
| ☐ | DETAIL REPORT | STANDARD PDF | DAILY | | | BANK DEFINED |
| ☐ | SUMMARY REPORT | STANDARD SCREEN | DAILY | | | BANK DEFINED |
| ☐ | DETAIL WITH TEXT REPORT | STANDARD PDF | DAILY | | ❖ | BANK DEFINED |
| ☐ | LOCKBOX DEPOSIT REPORT | STANDARD SCREEN | DAILY | | ❖ | BANK DEFINED |
| ☐ | RETURNED ITEM REPORT | STANDARD PDF | DAILY | | | BANK DEFINED |
| ☐ | NON-POST REPORT | STANDARD PDF | DAILY | | | BANK DEFINED |

1 REPORT SELECTED

QUERY DATE FOR SELECTED REPORTS

FROM: [ ] TO: [ ]

[ RUN ] [ EXPORT ] [ EMAIL ] [ ADD TO MY REPORTS ]

FIG. 3

FIG. 4  Information Reporting - Reports

INFORMATION REPORTING > REPORTS

| DASHBOARD | REPORTS | RESEARCH | STATEMENTS |

REPORTING | PAYMENTS | TRADE | LIQUIDITY | NOTIFICATIONS | SUPPORT | ADMIN

OPTIONS ▼

CREATE CUSTOM REPORT ☒

▷ SETUP REPORT
▷ SELECT ACCOUNTS
▽ ADDITIONAL SETUP OPTIONS
TRANSACTION BILL CODE
☐
☑ 2BA CREDIT (275)
☑ CONTROLLED DEPOSIT (300)
☑ SWEEP - INTEREST CREDIT (385)
☑ MISCELLANEOUS CREDIT (365)
☑ LOCATION DEPOSIT CREDIT (115)
5 TRANSACTIONS SELECTED | ADD TO QUALITY SET
CHOOSE COLUMNS
☑ ACCOUNT
☑ ACCOUNT NAME
☑ CLOSING LEDGER
☑ CLOSING AVAILABLE
☑ TOTAL CREDITS
☑ TOTAL DEBITS
☑ 1 DAY FLOAT
☑ 3 DAY FLOAT
☑ OPENING AVAILABLE
CREATE CUSTOM COLUMNS | DELETE EXISTING COLUMNS
FILTER REPORT BY:
CHOOSE PARAMETER ▽
▷ SCHEDULE AND DELIVER

DETAIL REPORT NAME
COMPANY: ABC CORP
REQUESTOR: JOHN DOE
RUN DATE: 00/00/0000  00:00:00 CST
AS OF:
BANK LOCATION: ILLINOIS
☐ ACCOUNT: XXXXXXXXXXX (MY ACCOUNT NAME I (USD))
  ☐ SUMMARY
    ☐ SUMMARY BALANCE

| TRANSACTION | AMOUNT |
|---|---|
| OPENING LEDGER (010) | 37,459.73 |
| OPENING LEDGER (015) | XX,XXX.XX |
| CLOSING LEDGER (015) | XX,XXX.XX |
| TODAY'S OPENING AVAILABLE BALANCE (140) | XX,XXX.XX |

☐ SUMMARY TOTALS

| TRANSACTION | AMOUNT | 0 DAY | 1 DAY FLOAT | 2 DAY FLOAT | COAST |
|---|---|---|---|---|---|
| TOTAL CREDITS (100) | XX,XXX.XX | XX,XXX.XX | XX,XXX.XX | XX,XXX.XX | X |
| TOTAL INCOMING WIRES (400) | XX,XXX.XX | XX,XXX.XX | XX,XXX.XX | XX,XXX.XX | X |
| TOTAL CREDITS (100) | XX,XXX.XX | XX,XXX.XX | XX,XXX.XX | XX,XXX.XX | X |
| TOTAL OUTGOING WIRES (400) | XX,XXX.XX | XX,XXX.XX | XX,XXX.XX | XX,XXX.XX | X |

☐ DETAILS
    ☐ CREDITS

| TRANSACTION | AMOUNT | 0 DAY | 1 DAY FLOAT | 2 DAY FLOAT | BANK FLOAT | CREDIT FLOAT |
|---|---|---|---|---|---|---|
| ☐ COMMERCIAL DEPOSIT CREDIT (301) | XX,XXX.XX | XX,XXX.XX | XX,XXX.XX | XX,XXX.XX | XX,XXX.XX | XX,XXX.XX |
| ☐ COMMERCIAL DEPOSIT CREDIT (301) | XX,XXX.XX | XX,XXX.XX | XX,XXX.XX | XX,XXX.XX | XX,XXX.XX | XX,XXX.XX |
| ☐ COMMERCIAL DEPOSIT CREDIT (301) | XX,XXX.XX | XX,XXX.XX | XX,XXX.XX | XX,XXX.XX | XX,XXX.XX | XX,XXX.XX |

| TEXT | NOTES | ADD NOTES |
|---|---|---|
| WIRE TYPE: WIRE IN ORIG: RENTAL TEST | I DID NOT RECEIVE AN EXPLANATION FOR THIS IN THE EMAIL. | |
| WIRE DATE: 00/00/00 CORP NO. XXXXXXX | I NEED A COPY OF THE CANCELED CHECK | |

FIG. 5

Information Reporting - Research

| DIRECT | REPORTING | PAYMENTS | TRADE | LIQUIDITY | NOTIFICATIONS | SUPPORT | ADMIN |

INFORMATION REPORTING > RESEARCH

| DASHBOARD | REPORTS | RESEARCH | STATEMENTS |

ADVANCED

☑ ADVANCED
☐ FIND OPTIONS ☐ FILTER REPORT

FIND
KEY WORD(S)     ☐ EXACT MATCH ☐ All REPORTS ▼
CRITERIA
AMOUNT                                  ▼
DATE              📅 TO     📅          FIND ALL

<< PREVIOUS | NEXT >>   (23)
☐ GO TO ACCOUNT

| ACCOUNT NUMBER BANK ID | ACCOUNT NAME |
|---|---|
| XXXXXXXXX | ACCOUNT NAME 8 |
| XXXXXXXXX | ACCOUNT NAME 12 |
| XXXXXXXXX | ACCOUNT NAME 3 |
| XXXXXXXXX | ACCOUNT NAME 4 |
| XXXXXXXXX | ACCOUNT NAME 5 |
| XXXXXXXXX | ACCOUNT NAME 14 |
| XXXXXXXXX | ACCOUNT NAME 11 |
| XXXXXXXXX | ACCOUNT NAME 9 |
| XXXXXXXXX | ACCOUNT NAME 1 |
| XXXXXXXXX | ACCOUNT NAME 4 |
| XXXXXXXXX | ACCOUNT NAME 8 |
| XXXXXXXXX | ACCOUNT NAME 14 |
| XXXXXXXXX | ACCOUNT NAME 3 |
| XXXXXXXXX | INTL ACCOUNT NAME 1 |
| XXXXXXXXX | INTL ACCOUNT NAME 2 |
| XXXXXXXXX | INTL ACCOUNT NAME |

🖨 PRINT  ✉ EMAIL  ⬇ EXPORT

📄 MULTIPLE PAGES

BANK LOCATION: SYDNEY
☐ ACCOUNT: XXXXXXXXXXXXX (INTL ACCOUNT NAMES I (AUD)
  ☐ SUMMARY
    ☐ SUMMARY BALANCE

| TRANSACTION | AMOUNT |
|---|---|
| OPENING LEDGER BALANCE (010) | XX,XXX.XX |
| CLOSING LEDGER BALANCE (015) | |
| COLLECTED CLOSING AVAIL BAL (045) | |
| 1 DAY AVAIL BALANCE (915) | |
| 2 DAY AVAIL BALANCE (916) | |
| 3 DAY AVAIL BALANCE (917) | |
| 4 DAY AVAIL BALANCE (918) | |
| 5 DAY AVAIL BALANCE (919) | |

☐ SUMMARY TOTALS

| TRANSACTION | AMOUNT | COUNT |
|---|---|---|
| TOTAL CREDITS (100) | | 1 |
| TOTAL DEBITS (400) | | 14 |

☐ DETAILS
  ☐ CREDITS

| TRANSACTION | AMOUNT | VALUE DATE | BANK REF | CUST REF |
|---|---|---|---|---|
| ☐ MISCELLANEOUS ACH CREDIT (169) | | | | BANK FEE A/C |

CREDIT TOTALS
☐ DEBITS

| TRANSACTION | AMOUNT | VALUE DATE | BANK REF | CUST REF |
|---|---|---|---|---|
| ☐ INTERNATIONAL MONEY TRNSFR DR (508) | | | | |

Information Reporting - Research Results

| | | | SEARCH RESULTS | EXPAND ALL | CLEAR FILTER | | | 330 RECORDS | |
|---|---|---|---|---|---|---|---|---|---|
| | DATE | ACCOUNT NUMBER | BANK ID | TRANSACTION | | CURRENCY | AMOUNT | CREDIT/DEBIT | CUSTOMER REF # |
| ⊞ | | XXXXXXXX | XXXXXXXX | OUTGOING MONEY TRANSFER DEBIT (495) | | USD | 7,168.13 | DEBIT | XXXXXXXXXXXX |
| ⊞ | | XXXXXXXX | XXXXXXXX | OUTGOING MONEY TRANSFER DEBIT (495) | | USD | 7,168.13 | DEBIT | XXXXXXXXXXXX |
| ⊞ | | XXXXXXXX | XXXXXXXX | OUTGOING MONEY TRANSFER DEBIT (495) | | USD | 7,168.13 | DEBIT | XXXXXXXXXXXX |
| ⊟ | | XXXXXXXX | XXXXXXXX | OUTGOING MONEY TRANSFER DEBIT (495) | | USD | 7,168.13 | DEBIT | XXXXXXXXXXXX |
| | TEXT | | | | NOTES | ADD NOTE | | | |
| | WT FED#XXXX BANK. JFTRBNF=NO NAME GIVEN SRT# TRN#XXXXXXXXX RFB# | | | | | | | | |
| ⊞ | | XXXXXXXX | XXXXXXXX | OUTGOING MONEY TRANSFER DEBIT (495) | | USD | 7,168.13 | DEBIT | XXXXXXXXXXXX |
| ⊞ | | XXXXXXXX | XXXXXXXX | OUTGOING MONEY TRANSFER DEBIT (495) | | USD | 7,168.13 | DEBIT | XXXXXXXXXXXX |
| ⊞ | | XXXXXXXX | XXXXXXXX | OUTGOING MONEY TRANSFER DEBIT (495) | | USD | 7,168.13 | DEBIT | XXXXXXXXXXXX |
| ⊞ | | XXXXXXXX | XXXXXXXX | OUTGOING MONEY TRANSFER DEBIT (495) | | USD | 7,168.13 | DEBIT | XXXXXXXXXXXX |
| ⊞ | | XXXXXXXX | XXXXXXXX | OUTGOING MONEY TRANSFER DEBIT (495) | | USD | 7,168.13 | DEBIT | XXXXXXXXXXXX |
| ⊞ | | XXXXXXXX | XXXXXXXX | OUTGOING MONEY TRANSFER DEBIT (495) | | USD | 7,168.13 | DEBIT | XXXXXXXXXXXX |
| ⊞ | | XXXXXXXX | XXXXXXXX | OUTGOING MONEY TRANSFER DEBIT (495) | | USD | 7,168.13 | DEBIT | XXXXXXXXXXXX |

[NEW SEARCH] [SAVE SEARCH]

FIG. 7

Local Language IR - Simplified Chinese

FIG. 9

METHOD AND APPARATUS FOR GLOBAL INFORMATION REPORTING

CROSS-REFERENCE TO RELATED APPLICATION

This application is a non-provisional application of U.S. Provisional Patent Application No. 61/418,985 filed on Dec. 2, 2010, entitled, "Global Information Reporting."

FIELD OF TECHNOLOGY

Aspects of the present invention relate to global financial information reporting.

BACKGROUND

Currently, conventional cash-management applications offer various aspects of information reporting. These aspects may include Prior and Current Day reporting, Multi Bank Consolidated Information, Online Statements, eStatements, and Balance & Detailed Transaction Searching.

It would be desirable to improve information reporting by consolidating multiple systems. It would be further desirable to enhance the user experience by providing a configurable data display. Likewise, it would be desirable to provide reports in local languages as needed.

SUMMARY

It is an object of the invention to integrate reporting with currency conversion. Providing quick conversion of transactions to the United States Dollar equivalent exposes cash positioning and value.

The present invention may also enable a configurable dashboard to customize views of specific items of interest including but not limited to Quick Report Access, Account Balances, Simple Item research, and important notifications.

Also, systems and methods according to the invention provide sophisticated reporting and data access. For example, configurable data downloads enable users to download the desired transactions in a format that facilitates easy integration with user systems. It is an object of the invention to provide data in multiple output formats including, but not limited to BAI2, SWIFT 940, SWIFT 942, SWIFT 950, ISO 20022 XML camt.052.001.02, and ISO 20022 XML camt.053.001.02. Standardization of data in known formats may deliver a consistent global experience.

In addition, systems and methods according to the invention may include one-click integrated functionality to facilitate service requests through a right-mouse-click for a specific transaction.

Migration of paper systems to electronic systems are facilitated by the invention. Likewise, retention of data allows users to leverage online reports for research and reconciliation.

Complex transaction research according to the invention may allow a user to easily find exception items. Systems and methods according to the invention may also include advanced filtering and searching, tailoring query results and custom reporting. Sophisticated parameter choices, advanced filtering and searching preferably allow users to tailor the content of the information provided in the query results and reports to streamline daily processes.

Creation of reports may be configurable according to user needs. The reports themselves are viewed in a separate window to allow easy cutting-and-pasting from the report into other applications. The reports themselves are configurable, allowing movement of columns, exposure of "rolled up" information and sorting of all data in the report. Searching and sorting of data in the report incorporates all data in the report even if the data is hidden from view.

Rapid page loading is facilitated by utilizing an HTML-style display with active areas—e.g., hotspots. A user click activates hotspots in the display. Activation may download a Java® applet for only a section of the report. The Java® applet permits manipulation of reports such as column movement and searching/sorting of data.

Furthermore, a rendition of research data may have access to the entire account list of a customer but displays only a small portion of the list as a "page". The use of such pagination techniques according to the invention reduces download times of the page. Nevertheless, the entirety of the list is available for searching/sorting and display.

Another aspect of the invention permits a user to attach "sticky notes" to any account. The sticky note will follow the account throughout any of the services provided by the dashboard. Account information may be kept for multiple years to ensure compliance with appropriate regulations.

In addition, it is an object of the invention to utilize local language and interface data capture capabilities to expand global access. Improved local language user interface and data capture abilities according to the invention; preferably allow broader use within the international marketplace.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows an illustrative GUI including an information reporting dashboard in accordance with the principles of the invention;

FIG. 3 shows an illustrative GUI including an information report selection in accordance with the principles of the invention;

FIG. 4 shows an illustrative GUI including an information report creation in accordance with the principles of the invention;

FIG. 5 shows an illustrative GUI including an information report viewer in accordance with the principles of the invention;

FIG. 7 shows an illustrative GUI including an information report research viewer in accordance with the principles of the invention;

FIG. 9 shows an illustrative GUI including an information report selection, translated into the Chinese language in accordance with the principles of the invention.

DETAILED DESCRIPTION OF THE DISCLOSURE

Figure 1A:
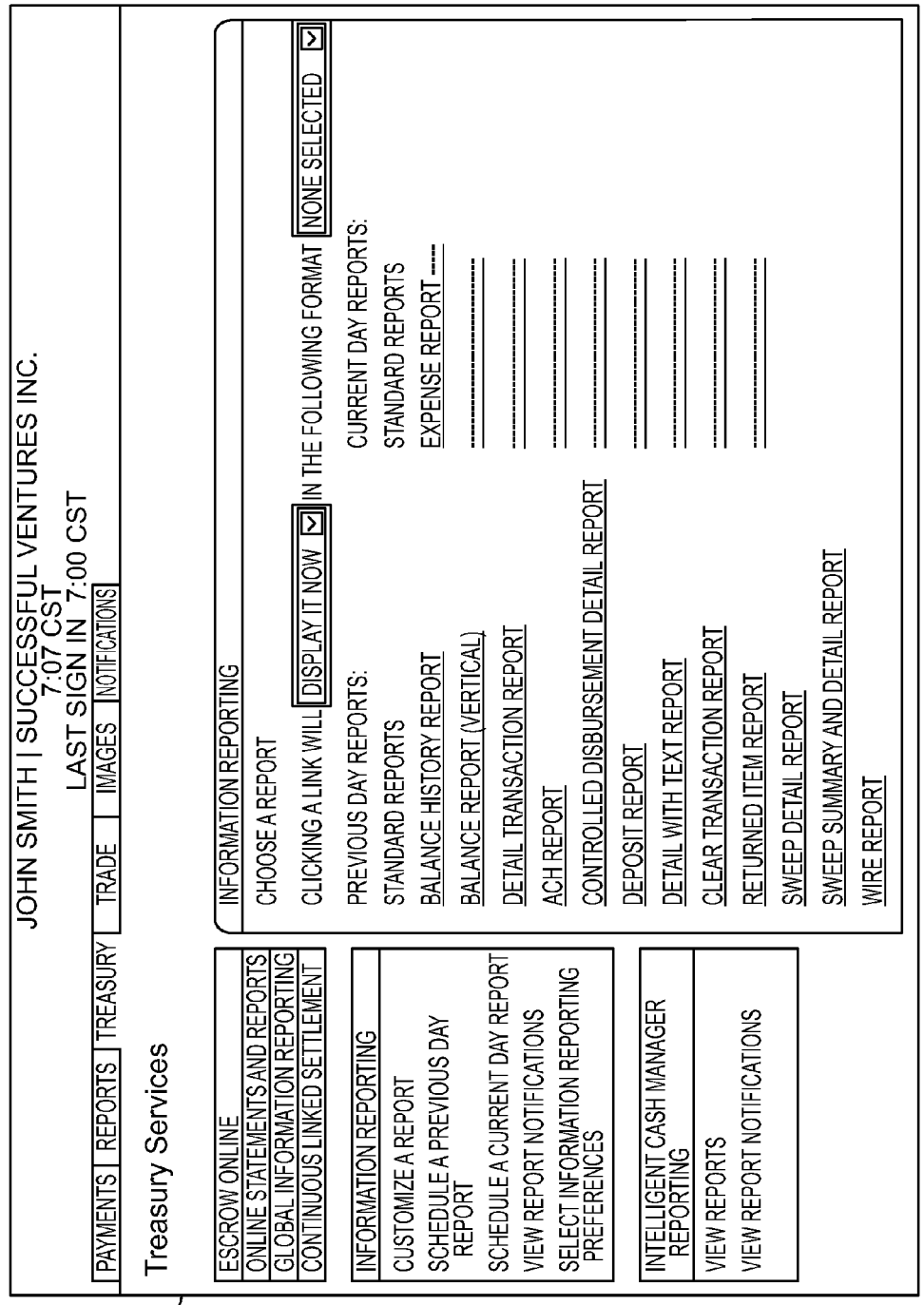
FIG. 1A shows a conventional Graphical User Interface (GUI) including information reporting.
Figure 1B:
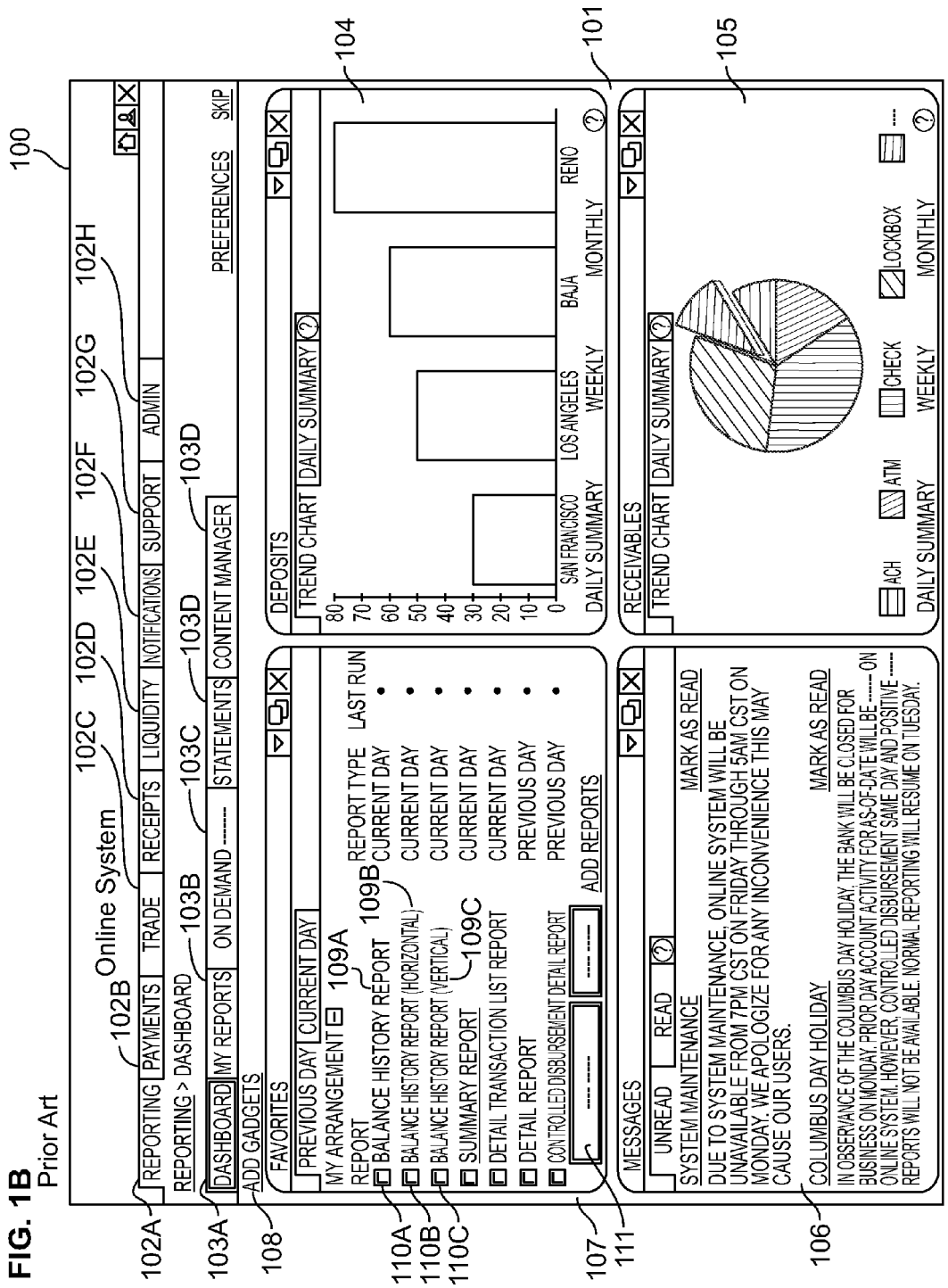
FIG. 1B shows another conventional Graphical User Interface (GUI) including information reporting.

FIGS. 1A and 1B show a conventional interface 199 and an illustrative dashboard interface 100. Interface 199 is an embodiment of a relatively simple interface which provides access to various reports. Interface 100 integrates banking and brokerage access. Interface 100 allows the selection of various reports and services as part of an integrated service GUI. Interface 100 may include selection tabs 102A-102H, where each tab may be used to select the interface of a different service. Each service interface, in turn, utilizes subtabs. Each subtab corresponds to a different aspect of a service.

Selection tab 102A selects a reporting service interface. The reporting service interface utilizes subtabs 103A-103E to access various aspects of the reporting service interface—e.g., dashboard 101, My Reports etc. The dashboard interface 101 is an illustrative information organization interface which consolidates the reporting of banking services and brokerage services.

The dashboard interface 101 provides access to payables, receivables, and cash position. The dashboard interface includes "gadgets"—sub-interfaces—deposits 104, receivables 105, bulletins 106 and favorites 107. Other gadgets may be added to the display by use of an "add gadget" button 108.

Deposits 104 shows a bar graph display of deposit information. Receivables 105 shows a pie chart display of receivables.

Bulletins 106 show system messages and other general information. Other suitable information such as stock price changes, economic news, weather, etc., can be shown in the bulletins gadget 106 or by another suitable gadget.

My reports 107 shows a list of favorites—i.e., commonly used—reports. A subset of the hyperlinks to reports is labeled 109A-109C. A subset of checkboxes 110A-110C is associated with exemplary hyperlinks 109A-109C respectively.

Access to the reports and other items within the invention is available via numerous methods to provide comfortable interaction for differently trained users and different usage. For example, a checkbox interface permits access to multiple reports at one time. Also, the reports may be accessed via one click on a hyperlink 109A-109C or by right clicking on the hyperlink and selection from a drop down menu (not shown), or by setting at least one of the checkboxes 110A-110C and clicking run reports button 111.

FIG. 2 shows an illustrative interface 200 that may integrate banking and brokerage access. Interface 200 may direct a user to select the interface to a reporting service by selecting reporting service tab 202A. The reporting service interface may utilize subtabs 203A-203D to access various aspects of the reporting service interface. Subtab 203A may direct a user to a dashboard interface 207.

The dashboard interface 207 according to an embodiment of the invention preferably provides access to a user configurable set of content. An illustrative set of content displayed by interface 207 is shown in FIG. 2. Such content may include balances 221 favorites 201, bulletins 206 and research 220. As described above reports listed by favorites 201 may be accessed by multiple methods for the convenience of the user. Other content may be added to the display by use of an "add content" button 108.

Additionally, the reports may be displayed/exported in multiple formats including standard formats—e.g., CVS—which provide easy integration with systems worldwide. Report may be scheduled which allows reports and files to be delivered when and where a user needs them.

FIG. 3 shows an illustrative interface 300 for information report editing. Interface 300 may allow a user to select the interface to a reporting service by selecting reporting service tab 302A. The reporting service interface may utilize subtabs 303A-303D to access various aspects of the reporting service interface. Subtab 303B may select a reports' interface 330.

The reports' interface 330 may be accessed as part of an access to favorites gadget 107, favorites 201, by selecting subtabs 103B or 203B or any other suitable method.

Interface 330 may enable flexible reporting which includes, custom reporting, research, and statements. As described above, reports listed by interface 330 may be accessed by multiple methods for the convenience of the user. Reports may be categorized by selection tabs 332A previous, 332B current and 332C complete. Other selections of reports are contemplated and included within the scope of the invention. Custom reports may be created by using a "create custom" button 331.

The research portal preferably allows a user to search for and find a variety of transactions. It also includes tactical reporting which provides a platform for quick and easy report generation, previous day and current day reporting. The dashboard preferably focuses on reports that are need-centered. The selection of such reports may preferably be provided through an algorithm that is based on report creation and post client use.

FIG. 4 shows an illustrative interface 400 for creating and viewing reports. Interface 400 may direct a user to select the interface to a reporting service by selecting reporting service tab 402A. The reporting service interface may utilize subtabs 403A-403D to access various aspects of the reporting service interface. Subtab 403B may select a report creating and viewing custom reports interface 440. Custom reports interface 440 may be accessed via various tools—e.g., favorites gadget 107, favorites 201, interface 330 or any other suitable method.

Customer reports interface 440 preferably provides creation subpanel 445 and viewing subpanel 446. Creation subpanel 445 may provide a platform for a user to create custom reports from pre-designed templates or from a report blank, in which a user can choose specific layout and information content.

Creation subpanel 445 may include various transaction types that may be selected, including, but not limited to, Zero Balance Account (ZBA) credit, Commercial Deposit, Sweep Interest Credit, Miscellaneous Credit and Lockbox Deposit Credit. Creation subpanel 445 may include various report columns that may be selected including, but not limited to, account, account name, closing ledger, closing available, total credits, total debits, 1 day Float, 2+ day Float and Opening Available.

Viewing subpanel 446 is an exemplary interface for viewing a report accessed by various interfaces discussed in this description—e.g., favorites gadget 107, favorites 201, interface 330 or any other suitable method. The viewing subpanel 446 may acquire current day, previous day, and completed reports preferably with one click.

The viewing subpanel 446 may dynamically adjust the display of the detailed reports as the various checkboxes, or other suitable access mechanisms, are selected by the user. Furthermore, the information related to the transaction types selected on the creation subpanel 445 may dynamically populate the viewing subpanel 446 when the transaction types are selected.

The dynamic display of reports by viewing subpanel 446 permits user changes in real-time. The changes include the moving of, the deleting of and the searching/filtering of a column or columns. Changes also include the rolling or unrolling of report sections.

Preferably the viewing subpanel 446 is implemented by active sections within an HTML webpage. In the alternative, the HTML code may be augmented or replaced by JavaScript. The active areas may comprise one or more small Java® applets.

The Java® applet implements all of the active functionality of the viewing subpanel 446. The Java® applet is preferably sufficiently small to enable rapid loading of the HTML page containing the viewing subpanel 446.

FIG. 4 shows an exemplary financial report and the interface to that report. Typically, the viewing area on the screen may be able to present only a small portion of a large report. Various methods may be used to present the data in a convenient form. The viewing subpanel 446 shows "unrolled" sections 450A, 450B and 450C. An unrolled section—e.g., section 450A may be rolled up by clicking the "−" 453A. The viewing subpanel 446 also shows "rolled up" sections 451A, 451B and 451C. A rolled up section—e.g., 451A may be unrolled up by clicking the "+" 454A. Sections may be organized hierarchically or in any other suitable arrangement.

Loading an active Java® applet with a complete version of a report would be time consuming and may even be useless given the limited screen size. Preferably, the small Java® applet according to the invention is programmed to manipulate only the viewable area of the selected report. The viewable area of the report may be changed by unrolling or rolling up sections, by scrolling or by any suitable method.

In certain embodiments of the invention, when a new section of the report becomes visible, new applets are accessible, preferably only in the active areas of the HTML. In the alternative, an applet that has already been loaded may augment its behavior to accommodate the change of viewable area. Thus, a minimal amount of new Java® code is downloaded—e.g., in one embodiment just a delta of Java® code supplements the pre-existing Java® code—upon changing the viewed area of a report or when loading a new report.

In certain embodiments, searches of reports may only search the text viewable on the screen. However, searches performed by customer reports interface 440 preferably search all of the data in the report including off-screen data and rolled up data. If relevant data is found by a search within a rolled up section, the data may be exposed by unrolling that section so the relevant data may be visible to the user.

Reports can be acquired in a variety of different formats including: PDF, BA12, Excel, QFX, SWIFT, and XML. Historical reports can be acquired, preferably for up to the past 15 months or any other suitable period. The reports can be emailed and/or exported directly from the system.

FIG. 5 shows an illustrative interface 500 for creating and viewing reports. Interface 500 may direct a user to select the interface to a reporting service by selecting reporting service tab 502A. The reporting service interface may utilize subtabs 503A-503D to access various aspects of the reporting service interface. Subtab 503B may select a report creating and viewing interface 550, hereinafter the reports interface 550. Reports interface 550 may be accessed via various interfaces—e.g., favorites gadget 107, favorites 201, interface 330 or any other suitable interface.

Reports interface 550 preferably provides find subpanel 557 and a viewing subpanel 556. The viewing subpanel shows an aspect of the invention that relates to custom information reporting. This allows a user to define a report name, select accounts and layout, and to choose specific transactions for a user's report. The choose report columns and custom sort options preferably present platforms for a user to filter the data to meet the users specific needs e.g., to retrieve information related to specific matters.

Another aspect of the invention also allows a user to schedule his report to be delivered at specific times. Further, it may also allow a user to preview a report as it is being created.

Figure 6:
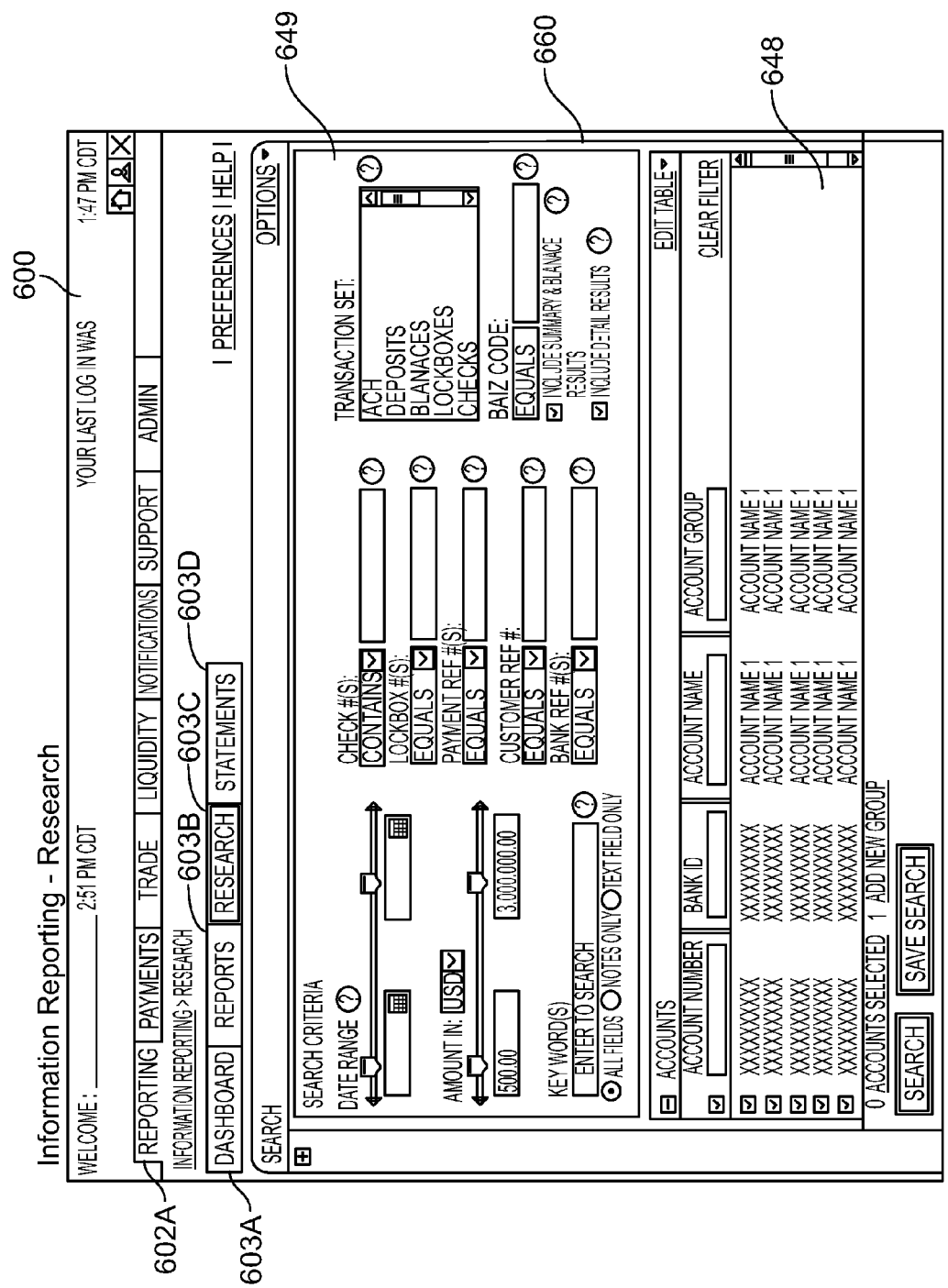
FIG. 6 shows an illustrative GUI including an information report research selection in accordance with the principles of the invention.

FIG. 6 shows an illustrative interface 600 for conducting research. Interface 600 may direct a user to select the interface to a reporting service by selecting reporting service tab 602A. The reporting service interface may utilize subtabs 603A-603D to access various aspects of the reporting service interface. Subtab 603C may select a research interface 660. Research interface 660 preferably provides search subpanel 649 and a listing subpanel 648. Research interface 660 may be accessed as with any suitable interface.

Accounts shown by the research interface may be displayed according to various criteria and tab/subtab selections. A portions of the accounts selected are loaded by "pages" to improve performance. Searching and sorting includes all accounts not just the "page" of accounts displayed or loaded. Similar lists shown in any gadgets or interface may improve loading speed and searching efficacy according to the same principles.

FIG. 7 shows an illustrative interface 700 for creating and viewing reports. Interface 700 may direct a user to select the interface to a reporting service by selecting reporting service tab 702A. The reporting service interface may utilize subtabs 703A-703D to access various aspects of the reporting service interface. Subtab 703C may select a research interface 770. Research interface 770 may be accessed as with any suitable interface.

Research interface 770 allows for research across 15 months, or any other suitable period, for information. A user can search for a specific amount and keyword. A user can narrow a search to information that is relevant to his organization. A user can also find specific transactions for rapid reconciliation. A user can search across all accounts simultaneously. All results are searchable and sortable.

Sticky note 775 is an exemplary note attached to a particular account and/or transaction. Sticky notes may be persistent and may remain attached to the account and/or transaction, even when the data is stored. The sticky note 775 may be attached via a unique reference number and may follow that number even when the data is transferred to other tools and interfaces. When data is searched the unique reference number may be displayed along with any sticky notes.

Figure 8:
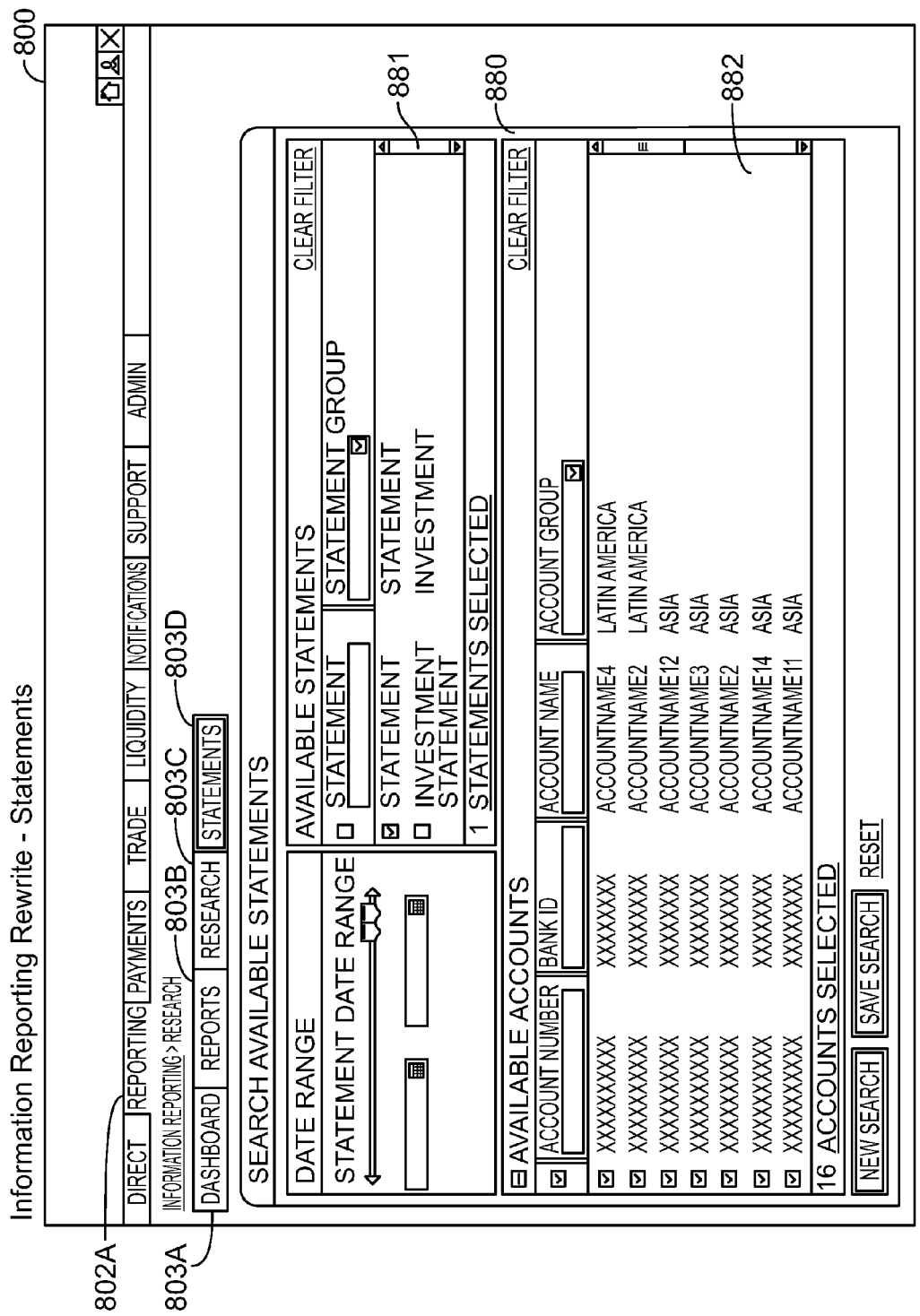
FIG. 8 shows an illustrative GUI including an statement selection in accordance with the principles of the invention.

FIG. 8 shows an illustrative interface 800 for creating and viewing reports. Interface 800 may direct a user to select the interface to a reporting service by selecting reporting service tab 802A. The reporting service interface may utilize subtabs 803A-803D to access various aspects of the reporting service interface. Subtab 803D may select a statement interface 880. Statement interface 880 preferably provides search subpanel 881 and a listing subpanel 882. Statement interface 880 may be accessed as by any suitable interface.

Statement interface 880 shows statements results in an information reporting system. The results show the relevant search results, which are sortable and searchable as described above. Statements may be expanded to see additional detail and add sticky notes to any transaction. The results can be exported, printed, or emailed for easy reconciliation.

A user can search for statements up to 15 months, or any other suitable interval, in the past. Available statements and reports may include bank statements, interest statements, investment statements, and EDI reports. A user can search across all accounts to find relevant reports and statements.

Figure 9:
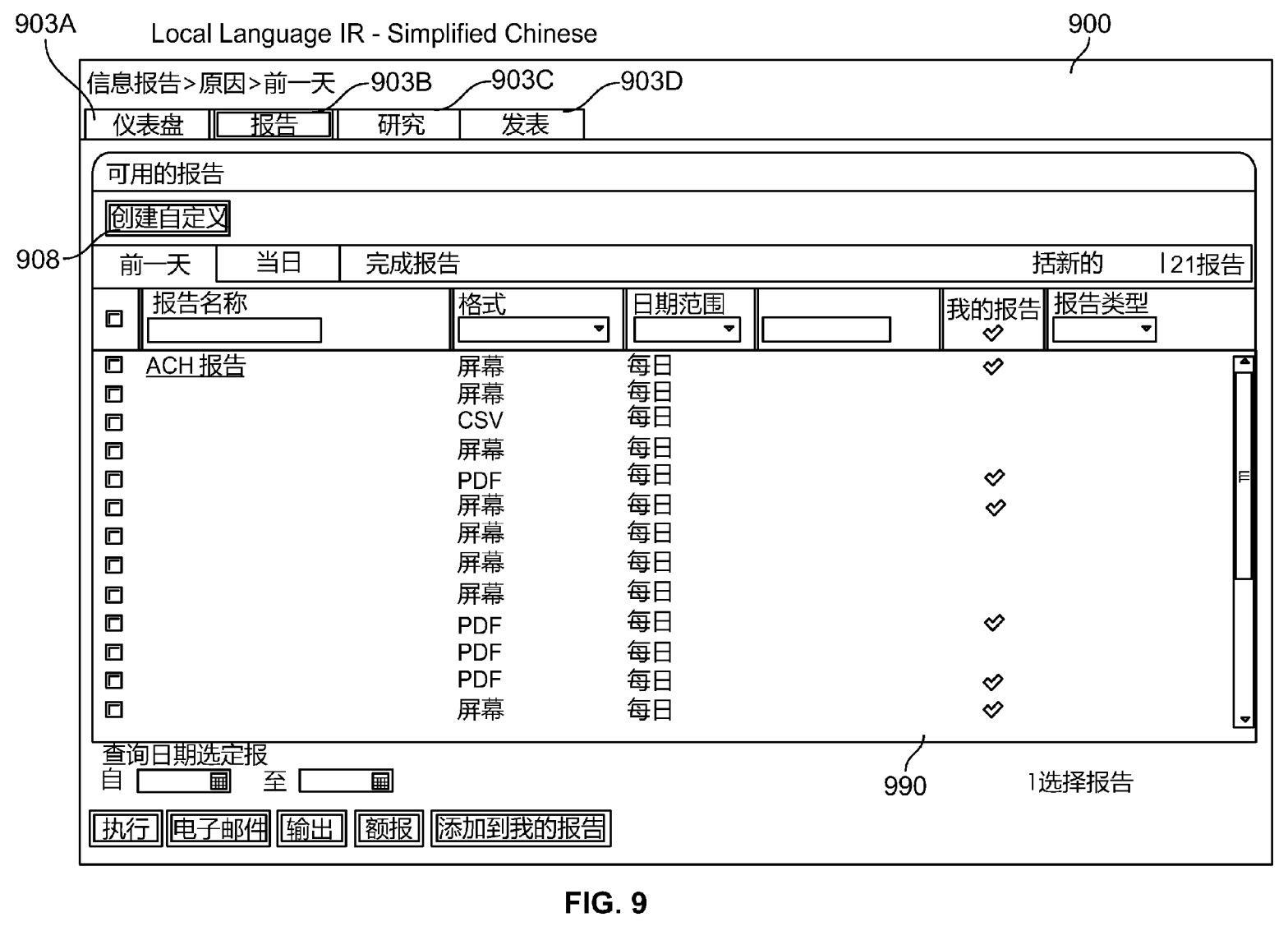

FIG. 9 shows an illustrative information system—local language IR 900 for creating and viewing items. Interface 900 may include selection of various interfaces by selecting a subtabs 903A-903D. Subtab 903B may select an interface 990. The local language interface allows a user to view the information system in his or her language. This local language support may be provided by mapping words from the original interface language to stock phrases in a local language. The mapping procedure permits rapid display of existing interfaces in simple local language terms without a complex translation process.

Figure 10:
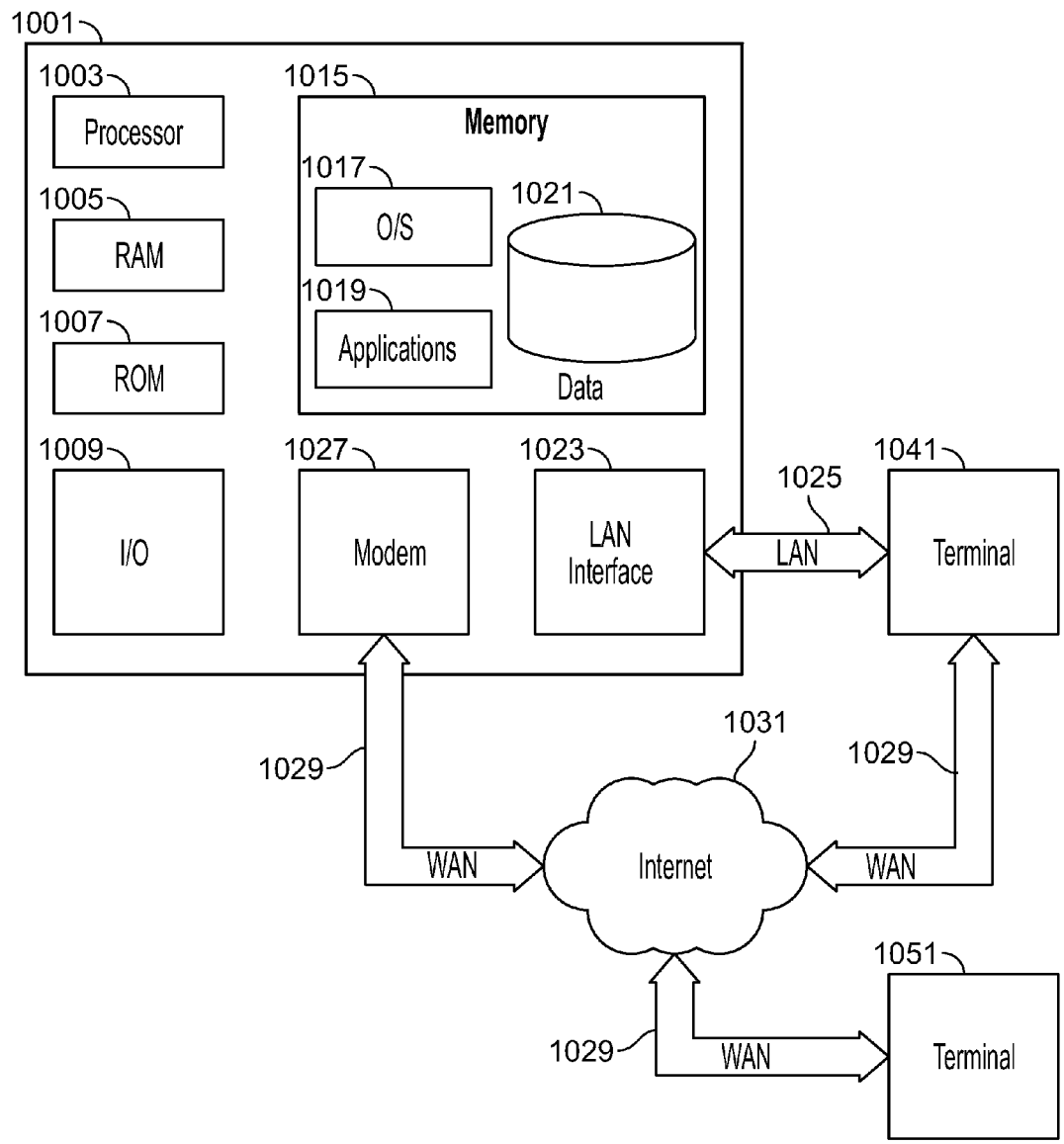
FIG. 10 shows illustrative apparatus that may be used in accordance with the principles of the invention.

FIG. 10 is a block diagram that illustrates a generic computing device 1001 (alternatively referred to herein as a "server") that may be used according to an illustrative embodiment of the invention. The computer server 1001 may have a processor 1003 for controlling overall operation of the server and its associated components, including RAM 1005, ROM 1007, input/output module 1009, and memory 1015. Server 1001 may include one or more receiver modules, server modules and processors that may be configured to transmit and receive reports, transactions, statements, and perform any other suitable tasks related to bank data consolidation and display.

Input/output ("I/O") module 1009 may include a microphone, keypad, touch screen, and/or stylus through which a user of device 1001 may provide input, and may also include one or more of a speaker for providing audio output and a video display device for providing textual, audiovisual and/or graphical output. Software may be stored within memory 1015 and/or storage to provide instructions to processor 1003 for enabling server 1001 to perform various functions. For example, memory 1015 may store software used by server 1001, such as an operating system 1017, application programs 1019, and an associated database 1021. Alternatively, some or all of server 1001 computer executable instructions may be embodied in hardware or firmware (not shown). As described in detail below, database 1021 may provide storage for customer information, eports, transactions, statements and any other suitable information.

Server 1001 may operate in a networked environment supporting connections to one or more remote computers, such as terminals 1041 and 1051. Terminals 1041 and 1051 may be personal computers or servers that include many or all of the elements described above relative to server 1001. The network connections depicted in FIG. 10 include a local area network (LAN) 1025 and a wide area network (WAN) 1029, but may also include other networks. When used in a LAN networking environment, computer 1001 is connected to LAN 1025 through a network interface or adapter 1023. When used in a WAN networking environment, server 1001 may include a modem 1027 or other means for establishing communications over WAN 1029, such as Internet 1031. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 1019, which may be used by server 1001, may include computer executable instructions for invoking user functionality related to communication, such as email, short message service (SMS), and voice input and speech recognition applications.

Computing device 1001 and/or terminals 1041 or 1051 may also be mobile terminals including various other components, such as a battery, speaker, and antennas (not shown).

Terminal 1051 and/or terminal 1041 may be portable devices such as a laptop, cell phone, blackberry, or any other suitable device for storing, transmitting and/or transporting relevant information.

Any information described above in connection with database 1021, and any other suitable information, may be stored in memory 1015.

One or more of applications 1019 may include one or more algorithms that may be used to perform one or more of the following: banking data consolidation and display and performing any other suitable tasks related to assessing banking data consolidation and display.

Each interface may make use of the mechanisms of active areas and use of small applets to provide efficiency as described with respect to report interface 550. Likewise the mechanism for loading portions of a set of large search results—e.g., as described with respect to the research interface 660—may be used with any suitable list of items. Sticky notes as described with respect to research interface 770 may be added to any suitable report, search, transaction etc.

Although the foregoing methods and apparatus have been described with regard to banking information, utilization of the inventive principles can be applied to any suitable data system.

Thus, methods and apparatus for global information reporting have been provided. Persons skilled in the art will appreciate that the present invention can be practiced by other than the described embodiments, which are presented for purposes of illustration rather than of limitation, and that the present invention is limited only by the claims that follow.

What is claimed is:

1. A global information reporting system comprising:
a database configured to store reporting information;
a memory configured to store execution instructions; and
a processor coupled with the database and the memory, the processor configured to execute the instructions, the instructions configured to cause the processor to:
portray a dynamically adjustable display of a global financial information report, the report comprising a plurality of contiguous sections;
wherein the adjustable display comprises:
a first portion providing at least one selection mechanism (s); and
a second portion providing a viewable contiguous portion of the global financial information report, the second portion configured to be:
dynamically populated in response to activation of the selection mechanism(s); and
dynamically depopulated in response to deactivation of the selection mechanism(s); and
wherein a non-viewable contiguous portion of the global financial information report is not generated in response to the activation or deactivation of the selection mechanism(s).

2. The global information reporting system of claim 1, wherein the selection mechanisms are related to transaction type and column selection;
wherein the transaction types comprise:
zero balance account credit;
commercial deposit;
sweep interest credit;
miscellaneous credit; and
lockbox deposit credit; and
wherein the column selection comprise:
account;
account name;
closing ledger;
closing available balance;
total credits;
total debits;
1 day float;
2+ day float; and
opening available balance.

3. The global information reporting system of claim 1 wherein, the second portion of the adjustable display is configured to be dynamically sorted in response to activation of a selection mechanism.

4. A global information reporting system comprising:
a memory configured to store execution instructions; and
a processor coupled with the memory, the processor configured to execute the instructions, the instructions configured to cause the processor to portray a dynamically adjustable display of a report, the report comprising a plurality of contiguous sections,
wherein the adjustable display comprises a first portion configured to portray a first activation area(s) linked to a first portion of the execution instructions, and a second portion configured to portray less than all of the plurality of the contiguous sections of the report;
wherein clicking the first activation area(s) causes the first portion of the execution instructions to generate only a first contiguous section of the report viewable in the second portion of the adjustable display without scrolling; and
wherein, the first portion of the execution instructions do not comprise executable instructions for generating and portraying another contiguous section of the report that is only viewable in the second portion of the adjustable display with scrolling.

5. The global information reporting system of claim 4, wherein the first portion of the adjustable display is configured to portray a second activation area(s) linked to a second portion of the execution instructions;
wherein, clicking the second activation area(s) causes the second portion of the execution instructions to generate and portray a second contiguous section of the report in a third portion of the adjustable display that is viewable without scrolling; and
wherein, the second contiguous portion of the execution instructions do not comprise executable instructions for generating and portraying another contiguous section of the report that is only viewable with scrolling.

6. The global information reporting system of claim 5 wherein the first activation area(s) are comprised of an applet configured to only manipulate the first contiguous portion of the report.

7. The global information reporting system of claim 4 wherein the first activation area(s) are configured to load instructions into a browser.

8. The global information reporting system of claim 7 wherein the activation of the first activation area(s) executes the instructions configured to cause the processor to dynamically adjust only a contiguous section of the report viewable without scrolling.

9. The global information reporting system of claim 4 wherein the report is comprised of data, wherein the first activation area(s) are configured to search only a portion of the data in the report viewable without scrolling.

10. The global information reporting system of claim 4 wherein the first activation area(s) are configured to cause a third contiguous section of the report to be removed from the adjustable display.

11. The global information reporting system of claim 4 wherein the first activation area(s) are configured to sort data.

12. The global information reporting system of claim 4 wherein the report is comprised of data, wherein the first activation area(s) are configured to sort only contiguous sections of the report that are viewable on the adjustable display without scrolling.

13. The global information reporting system of claim 4 wherein the report is comprised of data, wherein the first activation area(s) are configured to sort contiguous sections of the report that are portrayed on the adjustable display and contiguous sections of the report that are not portrayed on the adjustable display.

14. The global information reporting system of claim 9 wherein only a portion of the data found by the search is displayed.

15. A global information reporting system comprising:
a memory configured to store execution instructions; and
a processor coupled with the memory, the processor configured to execute the instructions, the instructions configured to cause the processor to populate and display a first contiguous portion of a report, the display of the first portion of the report comprising first activation area(s) linked to a first portion of the execution instructions,
wherein clicking the first activation area(s) causes the first portion of the execution instructions to expand the display of the first contiguous portion of the report by populating and displaying a second contiguous portion of the report; and
wherein the first portion of the executable instructions only comprise executable instructions for expanding an area of the display viewable without scrolling.

16. The global information reporting system of claim 15 wherein the first activation area(s) are configured to load the first contiguous portion of the report at a speed corresponding to an amount of data required to populate the display of the first contiguous portion of the report viewable without scrolling.

17. The global information reporting system of claim 15 wherein the display of the second contiguous portion of the report comprises second activation area(s) linked to a second portion of the execution instructions;
wherein the second portion of the executable instructions only comprise executable instructions for populating and displaying a third contiguous portion of the report that is viewable without scrolling.

18. The global information reporting system of claim 15 wherein clicking the first activation area(s) causes the first contiguous portion and the second contiguous portion of the report to be sorted.

19. The global information reporting system of claim 15 wherein clicking the first activation area(s) causes the first contiguous portion of the report, the second contiguous portion of the report and a non-viewable third contiguous portion of the report to be searched.

20. The global information reporting system of claim 15 wherein the first activation area(s) are configured to load instructions into a browser.

21. The global information reporting system of claim 15 wherein the first activation area(s) are comprised of an applet configured to only manipulate the first contiguous portion of the report viewable without scrolling.

22. The global information reporting system of claim 15 wherein the first activation area(s) are comprised of instructions, that when executed by the processor, only manipulate a contiguous portion of the report viewable without scrolling.

* * * * *